(12) United States Patent
Chabanne et al.

(10) Patent No.: US 9,686,454 B2
(45) Date of Patent: Jun. 20, 2017

(54) PERSONAL AUTHENTICATION DEVICE AND METHOD OF MANUFACTURING SUCH A DEVICE

(71) Applicant: MORPHO, Issy-les-Moulineaux (FR)

(72) Inventors: Herve Chabanne, Issy-les-Moulineaux (FR); Jean-Christophe Fondeur, Issy les Moulineaux (FR)

(73) Assignee: MORPHO, Issy-Les-Moulineaux (FR)

( * ) Notice: Subject to any disclaimer, the term of this patent is extended or adjusted under 35 U.S.C. 154(b) by 98 days.

(21) Appl. No.: 14/539,284

(22) Filed: Nov. 12, 2014

(65) Prior Publication Data
US 2015/0130918 A1 May 14, 2015

(30) Foreign Application Priority Data

Nov. 12, 2013 (FR) ..................................... 13 61021

(51) Int. Cl.
*H04N 5/225* (2006.01)
*G06F 21/32* (2013.01)
*G06F 21/83* (2013.01)
*G06K 9/00* (2006.01)

(52) U.S. Cl.
CPC ........... *H04N 5/2252* (2013.01); *G06F 21/32* (2013.01); *G06F 21/83* (2013.01); *G06K 9/00013* (2013.01)

(58) Field of Classification Search
CPC ..... G06F 21/32; G06F 21/83; G06K 9/00013; H04N 5/2252

USPC .......................................................... 348/77
See application file for complete search history.

(56) References Cited

U.S. PATENT DOCUMENTS

| 7,099,496 | B2 * | 8/2006 | Benkley, III | ....... G06K 9/00026 324/661 |
| 2001/0026636 | A1 * | 10/2001 | Mainguet | ........... G06K 9/00026 382/124 |
| 2003/0102874 | A1 * | 6/2003 | Lane | ..................... G06K 9/0002 324/662 |
| 2005/0231213 | A1 * | 10/2005 | Chou | ................. G06K 9/00053 324/662 |
| 2009/0155456 | A1 * | 6/2009 | Benkley | ............. G06K 9/00013 427/64 |

OTHER PUBLICATIONS

French Preliminary Search Report and Written Opinion issued Aug. 5, 2014 in FR 1361021.

* cited by examiner

*Primary Examiner* — Anner N Holder
(74) *Attorney, Agent, or Firm* — Oblon, McClelland, Maier & Neustadt, L.L.P.

(57) ABSTRACT

The invention relates to an authentication device (1), characterized in that it comprises a support (10) provided with a surface (12), said surface comprising a plurality of peaks (14) and valleys (15) forming a pattern (13) capable of being acquired by a digital fingerprint sensor.
The invention also relates to a method of manufacturing such a device.

10 Claims, 1 Drawing Sheet

PERSONAL AUTHENTICATION DEVICE AND METHOD OF MANUFACTURING SUCH A DEVICE

FIELD OF THE INVENTION

The field of the invention is that of personal authentication devices.

PRIOR ART

Digital fingerprint sensors are used increasingly commonly for carrying out identification or authentication of individuals.

For example, some telephones today are fitted with such sensors for authorising the owner to access content of the telephone or to access some functionalities such as access to digital applications, online payment, etc.

The security of these digital fingerprint sensors is not established, and it is especially easy to defraud these sensors by simulating the digital fingerprint of the owner. This fingerprint can even be taken from the telephone itself, since its owner handles it frequently.

Consequently, there is a security problem during use of a device equipped with such a digital fingerprint sensor.

In this respect, a device comprising a digital fingerprint sensor has been proposed in document US 2009/155456, one or more surfaces of which is designed so as not to leave traces of digital fingerprints on the sensor during authentication.

This prevents the fingerprint from being taken from the device bearing the fingerprint sensor itself, but not on all others surfaces likely to be touched by an individual. Security against misappropriation of digital fingerprints is therefore not clearly established.

PRESENTATION OF THE INVENTION

The aim of the invention is to make more secure the use of a digital fingerprint sensor for authentication, especially when this sensor is integrated into a personal object of a person, such as a mobile telephone.

In this respect, the aim of the invention is a personal authentication device for authentication of an individual on a system comprising a digital fingerprint sensor, comprising a support provided with a surface, said surface comprising a plurality of peaks and valleys forming a pattern capable of being acquired by a digital fingerprint sensor.

Advantageously, but optionally, the personal authentication device according to the invention can also comprise at least one of the following characteristics:
  the pattern formed by the peaks and the valleys is arranged so as not to correspond to a human digital fingerprint.
  the arrangement of the peaks and/or valleys in the pattern has been generated randomly.
  the pattern formed by the peaks and the valleys comprises at least two cores, preferably at least three cores.
  the support is made of supple or rigid material.
  The support being one of the following group: a card, a key ring, a ring, an earring.

Another aim of the invention is a method of manufacturing a device according to the preceding presentation, comprising generation, on a surface of a support, of a set of valleys and peaks forming a pattern capable of being acquired by a digital fingerprint sensor.

Advantageously, but optionally, the method of manufacturing also comprises at least one of the following characteristics:
  the method comprises a preliminary step for working out a pattern such that said pattern does not correspond to a human digital fingerprint.
  generation of the pattern on the support is done by etching, or embedding part of the surface of the support corresponding to the valleys of the pattern.

The device according to the invention heightens the security of the digital fingerprint sensor as it is personal to the individual, and can be kept secretly. The pattern located on the surface of the support is therefore not found on surfaces used by an individual, as opposed to the digital fingerprints of the individual. Accordingly, the pattern is not easily copied.

Also, it is advantageous for the pattern not to correspond to a digital fingerprint of an individual to prevent use of the pattern allowing authentication in place of a third person.

DESCRIPTION OF FIGURES

Other characteristics, aims and advantages of the present invention will emerge from the following detailed description with respect to the appended figures given by way of non-limiting example and in which.

DETAILED DESCRIPTION OF AT LEAST ONE EMBODIMENT OF THE INVENTION

Figure 1A:
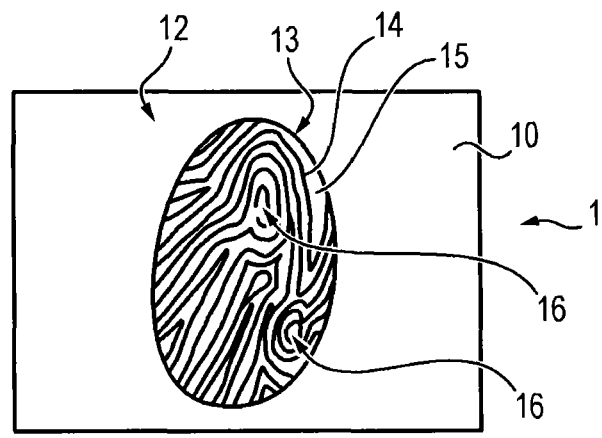
FIGS. 1a and 1b represent several examples of personal devices according to the invention.
Figure 1B:
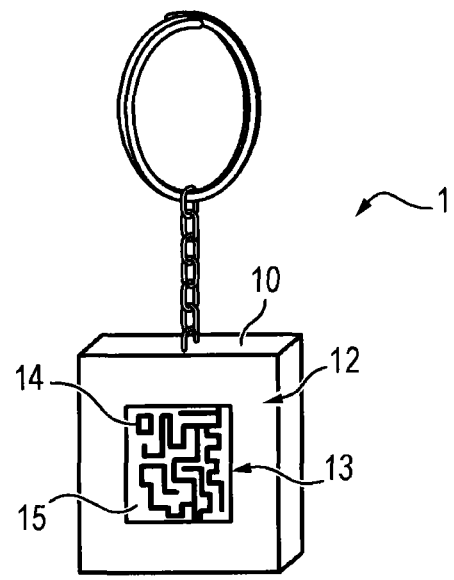

FIGS. 1a and 1b illustrate a personal authentication or identification device 1. This device 1 comprises a support 10 fitted with a surface 12.

The support 10 is advantageously plane. It can be rigid, for example by being made of rigid plastic or metal, or supple, preferably by being made of gelatin, glycerin or material based on glycerine—as described in the article by C. Barral and A. Tria: *Fake Fingers in Fingerprint Recognition: Glycerin supersedes gelatin*, Formal to Practical Security 2009: 57-69, 2008—cardboard, paper, or other.

The device 1 is a personal authentication device which can serve for example to authenticate with a portable device. It is therefore advantageously portable. The support 10 advantageously has the form of a card, for example in credit card format as illustrated in FIG. 1a, to be stored in a wallet, or on a key ring, as in FIG. 1b, or even on jewelry such as a ring, an earring, etc.

On the surface 12 is a pattern 13 comprising a set of peaks 14 and valleys 15, the pattern 13 being capable of being acquired (or read) by a digital fingerprint sensor.

In this respect, the pattern 13 advantageously has a surface of less than 10 cm$^2$, advantageously less than 4 cm$^2$, for example a surface of 13*30 mm or a surface of 5*5 mm, and the peaks and the valleys advantageously have a width less than 1 mm, advantageously of the order of 0.2 mm, and a depth (distance between the apex of a peak and the hollow of a valley) of between 1 µm and 1 mm, advantageously of the order of 200 µm.

In this way the personal authentication device plays the role of a password which can be kept and which is distinct from the digital fingerprint of the individual and ensures greater security during use with a fingerprint sensor.

The pattern 13 formed by the peaks and the valleys can be generated randomly.

The pattern 13 can also be generated as a digital fingerprint, for example by executing the method described in the publication by R. Cappelli, D. Maio, D. Maltoni and A. Erol: Erol: Synthetic Fingerprint-Image Generation, ICPR 2000: 3475-3478.

Advantageously, even though the probability is infinitesimal, to prevent the pattern 13 corresponding in reality to a human digital fingerprint, the method of working out the pattern can be adapted so that the pattern does not correspond to such a digital fingerprint.

In this respect, the pattern can comprise some additional characteristics not present in digital fingerprints, for example:
- A number of cores 16 (that is, the heart, or the centre of the digital fingerprint, around which a loop or a spiral formed by the peaks and valleys is wound) greater than 2, and even greater than 3,
- A geometric form not present in the natural state, for example a square, a straight line, etc.

The pattern 13 of the personal device 1 can therefore have a wide variety of embodiments, allowing a personal device comprising a unique pattern to be associated with any individual.

This device 1 can therefore be used for authentication on a system comprising a digital fingerprint sensor and a processor. For this to occur, the surface 12 provided with the pattern 13 is placed against the sensor and the latter acquires the pattern 13. The processor then performs a comparison between said pattern and one or more other patterns recorded elsewhere, either in a secure database of the system, or in a remote memory with which the system can communicate remotely.

Figure 2:
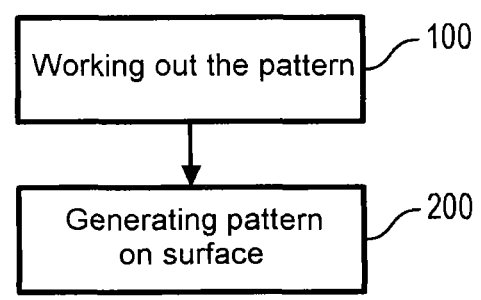
FIG. 2 represents the principal steps of a method of manufacturing such a device.

In reference to FIG. 2, this shows the principal steps of a method of manufacturing such a device.

A first step 100 consists of working out a pattern 13 formed by peaks and valleys. This step can be performed by application of the method described in the publication Synthetic Fingerprint-Image Generation mentioned earlier, or by generating peaks randomly on a dedicated surface corresponding to the surface of the pattern.

A second step 200 consists of making the pattern 13 on a surface 12 of a support 10. As a function of the nature of the substance making up the support, this step can be performed by etching (for example for material such as metal) embedding (material of cardboard or paper type), or local thinning by removing material (for material of gelatin, glycerin or other supple material type) from part of the surface to form the valleys (and the rest forming the peaks) of the pattern.

The invention claimed is:

1. A personal authentication device for the authentication or identification of an individual on a system having a digital fingerprint sensor, the device comprising:
    a support provided with a surface, said surface having a plurality of peaks and valleys forming a pattern configured to be read by the digital fingerprint sensor to authenticate or identify the individual.

2. The personal authentication device according to claim 1, wherein the pattern formed by the peaks and the valleys is arranged so as not to correspond to a human digital fingerprint.

3. The personal authentication device according to claim 1, wherein the arrangement of peaks and valleys in the pattern is randomly generated.

4. The personal authentication device according to claim 2, wherein the pattern formed by the peaks and the valleys includes at least two cores.

5. The personal authentication device according to claim 1, wherein the support is made of a supple or rigid material.

6. The personal authentication device according to claim 1, said support being one of a card, a key ring, a ring, and an earring.

7. A method of manufacturing a device, comprising:
    generating, on a surface of a support, a set of valleys and peaks forming a pattern configured to be read by a digital fingerprint sensor to authenticate or identify an individual.

8. The method of manufacturing according to claim 7, further comprising:
    working out, prior to the generating, a pattern such that said pattern does not correspond to a human digital fingerprint.

9. The method of manufacturing according to claim 7, wherein the generating of the pattern on the support is carried out by etching or embedding of part of the surface of the support corresponding to the valleys of the pattern.

10. A method for authenticating an individual, comprising:
    acquiring, via a digital fingerprint sensor, a pattern formed on a surface of a personal authentication or identification device, the surface being provided on a support and having a plurality of peaks and valleys;
    comparing the pattern with at least one other pattern; and
    performing authentication or identification based on the results of the comparing.

* * * * *